_United States Patent_ [19]

Lew

[11] Patent Number: 4,850,410
[45] Date of Patent: Jul. 25, 1989

[54] CONTINUOUS SNOW CHAIN

[76] Inventor: Hyok S. Lew, 7890 Oak St., Arvada, Colo. 80005

[21] Appl. No.: 701,345

[22] Filed: Feb. 13, 1985

[51] Int. Cl.$^4$ .............................................. B60C 27/06
[52] U.S. Cl. .............................. 152/213 A; 24/68 TT;
24/69 TT; 152/218; 152/221; 152/242;
152/243; 301/42; 403/213
[58] Field of Search ............... 152/208, 213 R, 213 A,
152/216, 217–223, 231, 239, 240–242, 232, 243;
301/42; 403/213, 209, 206; 29/452; 24/68 TT,
69 TT

[56] References Cited

U.S. PATENT DOCUMENTS

| | | | |
|---|---|---|---|
| 2,059,100 | 10/1936 | Green | 152/213 A |
| 4,304,280 | 12/1981 | Lew | 152/241 X |
| 4,390,053 | 6/1983 | Rieger et al. | 152/242 X |

Primary Examiner—Michael W. Ball
Assistant Examiner—Thomas Bokan

[57] ABSTRACT

This invention relates to a continuous snow chain comprising three cords or chains disposed in zig-zag patterns and connected to each other in a network of cords or chains of a finite length including two parallel rows of substantially diamond-shaped openings. One cord or chain constituting one boundary of the network of cords or chains is slidably connected to a first retaining cord at each of the zig-zag points constituting the one boundary of the network of cords or chains, which first retaining cord includes means for connecting two extremities thereof to one another. The other cord or chain constituting the other boundary of the network of cords or chains is slidably connected to a second retaining cord at each of the zig-zag points constituting the other boundary of the network of cords or chains, which second retaining cord includes means for connecting two extremities thereof to one another. A segment of a cord or chain connected to one extremity of the second retaining cord and extending therefrom converts the open segment of the network of cords or chains into a closed loop when the segment of a cord or chain is routed through the diamond-shaped openings disposed at two extremities of the network of cords or chains in a zig-zag pattern across the network of cords or chains and the extremity thereof is connected to the connection between two extremities of the first retaining cord.

6 Claims, 1 Drawing Sheet

CONTINUOUS SNOW CHAIN

BACKGROUND OF THE INVENTION

It requires only an elementary understanding of centrifugal force to realize that any snow chain including one or more chain or cord elements disposed across the tread surface of the tire in a substantially perpendicular angle thereto is bound to create pounding and noise, which damages the road surface as well as the automobile tire and irritates the driver and passengers. Even at only moderately high speeds, the elements of the snow chain disposed across the tread surface of the tire float away from the tread surface of the tire because of the centrifugal force and impact on the road surface when the floating elements of the snow chain are brought down to the road surface by the rotating automobile wheel. There is only one remedy for this destructive and aggravating problem existing with all of the present day snow chains, that is to eliminate all elements in the snow chain disposed across the tread surface of the tire. The construction of a snow chain that does not include any element disposed across the tread surface of the tire in a substantially perpendicular angle has been invented by the inventor of the present invention and was disclosed in U.S. Pat. Nos. 4,304,280 and 4,261,404, wherein the construction of the continuous snow chain including all elements disposed in shallow oblique angles with respect to the circumferential direction of the tread surface of the tire is taught. The elements of the continuous snow chain arranged in the aforementioned way also float because of centrifugal force. However, those elements of the continuous snow chain floated by centrifugal force do not impact on the road surface, bounce back and impact on the tire because they become continuously squeezed between the road surface and the tread surface of the tire as the floating element of the snow chain is brought down to the road surface by virtue of all elements of the continuous snow chain disposed substantially in the circumferential direction of the tread surface of the tire instead of thereacross as in the case of the conventional snow chain. For this reason, the continuous snow chain provides a much higher high speed capability and a more quiet ride compared with any conventional snow chain while providing equal or even better traction on snow as well as on ice. One serious problem with the continuous snow chain is the difficulty involved in installing the continuous snow chain on an automobile tire, when the continuous snow chain is constructed in a closed loop configuration.

The primary object of the present invention is to provide a continuous snow chain that is easy to install on and to take off from an automobile tire.

Another object is to provide a continuous snow chain comprising a segment of network of cords or chains of finite length that is converted to a closed loop by a linking cord or chain disposed in zig-zag pattern that connects two extremities of the network of cords or chains and converts it into a closed loop configuration as the linking cord or chain is routed through the diamond-shaped openings disposed at two extremities of the network of cords or chains.

A further object is to provide a continuous snow chain including a pair of retaining cords respectively retaining and contracting two end openings of the network of cords or chains arranged in a closed loop by means of the linking cord or chain in retaining the continuous snow chain as disposed around the tire following the tread surface thereof.

Yet another object is to provide a continuous snow chain that allows an automobile to be driven at high speeds without creating damage to the road surface or to the automobile.

Yet a further object is to provide a continuous snow chain that does not create high levels of noise.

These and other objects of the present invention will become clear as the description thereof proceeds.

BRIEF DESCRIPTION OF FIGURES

The present invention may be described with a greater clarity and specificity by referring to the following figures.

DESCRIPTION OF THE ILLUSTRATED EMBODIMENTS

Figure 1:
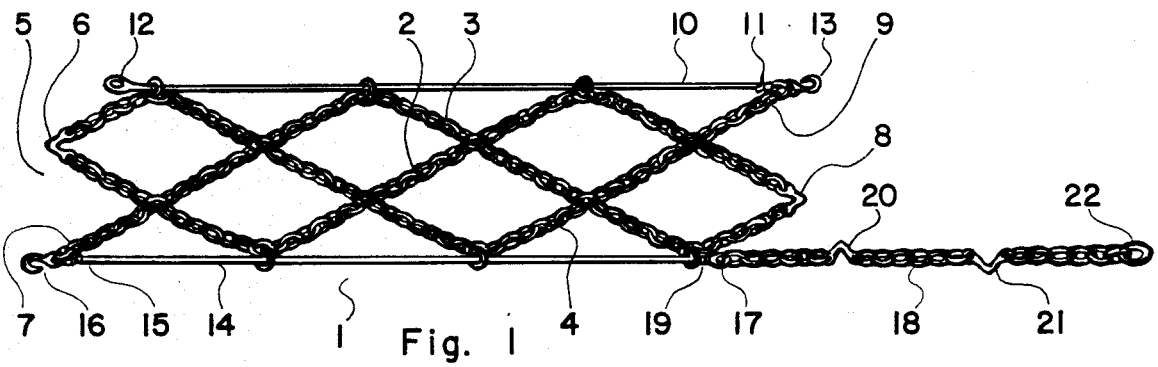
FIG. 1 illustrates a plan view of a continuous snow chain comprising a network of link chains and a pair of retaining cables.

In FIG. 1 there is illustrated a plan view of an embodiment of the continuous snow chain 1 constructed in accordance with the principles of the present invention. The continuous snow chain 1 comprises a first chain 2 disposed in zig-zag pattern intermediate a second chain 3 and a third chain 4 respectively disposed in zig-zag pattern wherein those three chains are connected to each other and assembled into a network configuration of a finite length including two parallel series of diamond-shaped openings. At one extremity of the network of chains one extremity of the first chain 2 and one extremity of the second chain 3 are connected to one another by an angle link 6, while one extremity 7 of the chain 4 is disposed by itself. At the other extremity of the network of chains, the other extremity of the chain 2 and the other extremity of the chain 4 are connected to each other by an angle link 8, while the other extremity 9 of the chain 3 is disposed by itself. The chain 3 is connected to a first retaining cord 10 at each of the zig-zag points constituting one boundary of the network of chains and at the extremity 9 of the chain 3 wherein the first retaining cord 10 is slidable relative to the chain 3 at least at all connections therebetween excluding one connection therebetween. In specific embodiment shown in FIG. 1, the extremity 9 of the chain 3 is nonslidably connected to the extremity 11 of the first retaining cord 10. Of course, the connection between the extremity 9 of the chain 3 and the extremity 11 of the retaining cord 10 may be made slidable if such an arrangement is desirable. Two extremities of the retaining cord 10 respectively includes means 12 and 13 for connecting the two extremities to one another. The chain 4 is connected to a second retaining cord 14 at each of the zig-zag points constituting the other boundary of the network of chains and at the extremity 7 of the chain 4 wherein the second retaining cord 14 is slidable relative to the chain 4 at least at all connections therebetween excluding one connection therebetween. In the specific embodiment illustrated in FIG. 1, the extremity 7 of the chain 4 is nonslidably connected to the extremity 15 of the second retaining cord 14, which connection may be made slidable if necessary. Two extremities of the second retaining cord 14 respectively includes means 16 and 17 for connecting the two extremities to one another. A linking chain 18 connected to the extremity 19 of the second retaining cord 14 and extending therefrom is divided into three segments by a pair of angle links 20 and 21, which linking chain also includes a means 22 disposed at the free-end thereof for connecting the linking chain 18 to the junction where the extremity 11 of the first retaining cord 10 and the extremity 9 of the chain 3 are connected to one another. The angle links 20 and 21 included in the linking chain 18 is for respectively engaging the angle links 6 and 8 included in the network of chains when the linking chain 18 is used to form a closed loop of the network of chains from the open loop as shown in FIG. 1. It should be understood that the link chain 18 can be connected to the extremity 7 of the chain 4 instead of the extremity 19 of the retaining cord 14, which arrangement is also the teaching of the present invention. The specific arrangement illustrated in FIG. 1 provides an advantage in that the link chain 18 connected to the retaining cord 14 can be used as a handle in pulling and closing the retaining cord 14 into a closed loop during installation, when the retaining cord 14 placed behind tire provides a poor accessibility.

Figure 2:
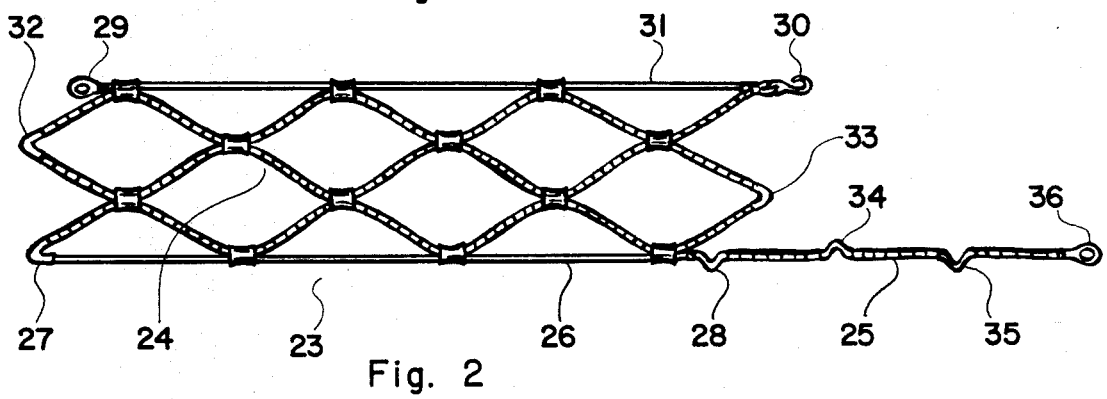
FIG. 2 illustrates a plan view of another continuous snow chain comprising a network of beaded cables and a pair of retaining cables.

In FIG. 2 there is illustrated a plan view of another embodiment of the continuous snow chain 23 that is constructed in essentially the same manner as the continuous snow chain 1 shown in FIG. 1 with a few exceptions. The network 24 of traction cords providing the traction and the linking cord 25 connected to and extending from the retaining cord 26 is made of beaded cords which may be wire ropes or fabric ropes or plastic cords protected by a plurality of beads made of hard material threaded thereon. The connecting means 27 and 28 respectively disposed at two extremities of the retaining cord 26 for connecting the two extremities to one another include a pair of angled tubular elements 27 and 28 threaded through by the retaining cord 26 that may be an extension of a cord constituting the network 24 included in the continuous snow chain 23. The connecting means 29 and 30 respectively disposed at two extremities of the retaining cord 31 comprises an eyelet and a hook. The traction network 24 includes a pair of angled tubular elements 32 and 33 playing the same role as the angle links 6 and 8 included in the continuous snow chain 1 of FIG. 1, while the linking cord 25 includes a pair of angled tubular elements 34 and 35 playing the same role as the angle links 20 and 21 of the continuous snow chain 1. The linking cord 25 includes a connection means 36 at the free-end thereof that is connectable to the junction including connection means 30.

Figures 3, 4, 5:
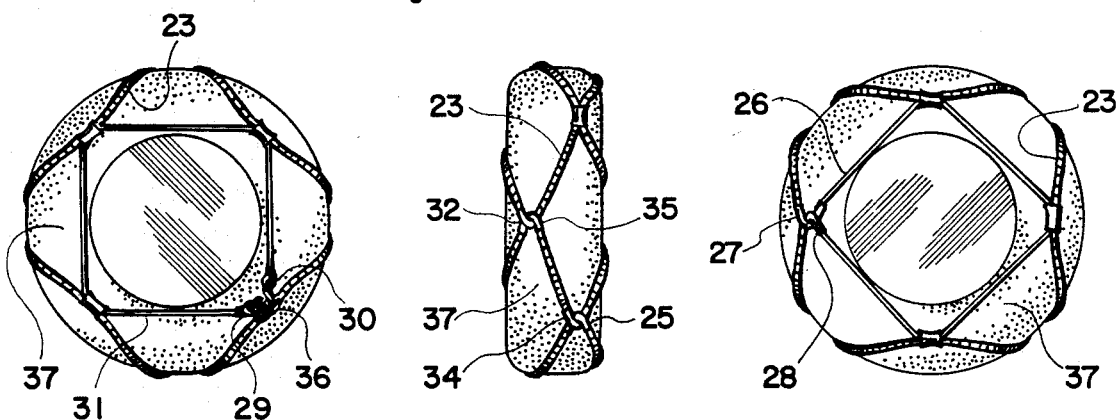
FIG. 3 illustrates an outside elevation view of an automobile tire with a continuous snow chain of FIG. 2 installed thereon.
FIG. 4 illustrates the front elevation view of the automobile tire with a continuous snow chain shown in FIG. 3.
FIG. 5 illustrates an inside elevation view of the automobile tire with a continuous snow chain shown in FIG. 5.

In FIG. 3 there is illustrated an outside elevation view of an automobile tire with the continuous snow chain 23 installed thereon.

In FIG. 4 there is shown a front elevation view of the automobile tire 37 with the continuous snow chain 23.

In FIG. 5 there is shown an inside elevation view of the automobile tire 37 with the continuous snow chain 23, which view is taken from a position adjacent to the opposite tire.

In order to understand how the continuous snow chain 23 is installed on the tire 37 it is useful to observe and study FIGS. 2, 3, 4 and 5 simultaneously. In installing the continuous snow chain 23 on the tire 37, firstly the automobile tire is driven on top of the continuous snow chain 23 spreaded on the ground as shown in FIG. 2 wherein the tire 37 rests on the continuous snow chain 23 near either one of two extremities thereof. Secondly, the continuous snow chain 23 is looped around following the tread surface of the tire 37 and the linking cord 25 is routed through the triangular opening including the angled tubular element 27 as one of its corner, whereupon the angled tubular element 28 is pulled towards the angled tubular element 27 untill they engage each other. Thirdly, the linking cord 25 is routed through two diamond-shaped openings of the traction network 24 respectively disposed at two extremities thereof whereupon the angled tubular element 34 engages the angled tube segment 33 and the angled tubular element 35 engages the angled tubular element 32. Lastly, the extremity of the linking cord 25 is secured to the junction including the connection means 30 by means of the connection means 36. The continuous snow chain 23 can be taken off easily from the tire 37 by reversing the process employed in installing the continuous snow chain onto the tire. Hereafter, the term "linking element" will be used in place of the angled tubular elements 32, 33, 34 and 35 included in the continuous snow chain 23 shown in FIG. 2 as well as in place of the angle links 6, 8, 20 and 21 included in the continuous snow chain 1 shown in FIG. 1. The term "flexible elongated member" will be used to imply the chains or the beaded cords or any other elongated members employed in constructing the traction network included in the continuous snow chain. It should be understood that the traction network included in the continuous snow chain shown in FIG. 1 may be constructed in such a way that the chains 3 and 4 are replaced with beaded cords while the chain 2 is made of link chain.

Figure 6:
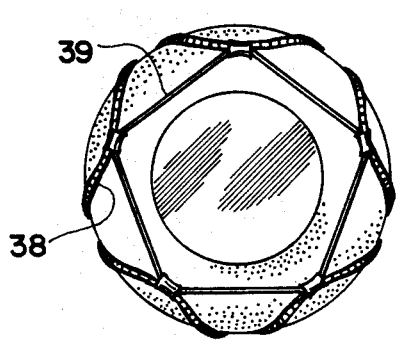
FIG. 6 illustrates an elevation view of another continuous snow chain installed on an automobile tire.

In FIG. 6 there is illustrated an elevation view of another embodiment of the continuous snow chain installed on an automobile tire. The continuous snow chain 38 includes four diamond-shaped openings in each of two rows thereof constituting the traction network and, consequently, the retaining cord 39 retains the shape of a pentagon, while the retaining cords included in the continuous snow chains 1 or 23, that includes three diamond-shaped openings in each of two rows thereof constituting the traction network, retains the shape of square, respectively.

Figure 7:
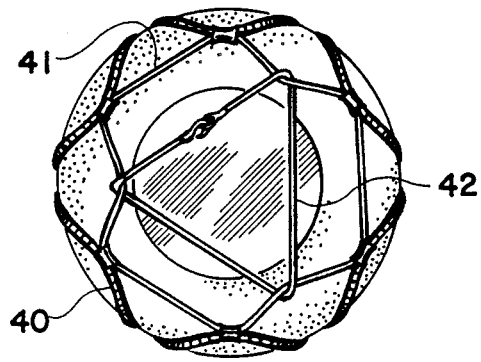
FIG. 7 illustrates an elevation view of a further continuous snow chain installed on an automobile tire.

In FIG. 7 there is illustrated an elevation view of a further embodiment of the continuous snow chain 40 that includes five diamond-shaped openings in each of two rows thereof constituting the traction network. The retaining cord 41 retains the shape of a hexagon, which may be further tensioned by an elastic tensioning band 42. It is obvious that one or more of elastic tensioning bands may be used in conjunction with the continuous snow chains shown in FIGS. 3 and 6. It is quite clear that the continuous snow chains with its retaining cord taking the shape of a triangle, square, a pentagon, a hexagon, a heptagon, or octagon, a nonagon, a decagon, etc. can be constructed by employing appropriate combinations of the diamond-shaped openings in the traction network included in the continuous snow chain.

While the principles of the present invention have now been made clear by the illustrative embodiments, it will be immediately obvious to those skilled in the art many modifications of the structures, arrangements, proportion, elements and materials which are particularly adapted to the specific working environments and operating conditions in the practice of the invention without departing from those principles.

I claim:

1. A continuous snow chain comprising in combination :
   (a) a first flexible elongated member disposed in zigzag pattern intermediate a second flexible elongated member and a third flexible elongated member respectively disposed in zig-zag pattern, said first, second and third flexible elongated members connected to each other and assembled in a network of flexible elongated members of a finite length including two parallel rows of substantially diamond-shaped openings wherein one extremity of said second flexible elongated member and one extremity of said second flexible elongated member are connected to one another and one extremity of said third flexible elongated member is disposed by itself at one extremity of said network of flexible elongated members, and the other extremity of said first flexible elongated member and the other extremity of said third flexible elongated member are connected to one another and the other extremity of said second flexible elongated member is disposed by itself at the other extremity of said network of flexible elongated members;
   (b) a first retaining cord disposed substantially parallel to said two rows of diamond-shaped openings included in said network of flexible longated members along one boundary of said network of flexible elongated members and connected to said second flexible elongated member at each of zig-zag points and said the other extremity of said second flexible elongated member constituting said one boundary of said network of flexible elongated members wherein the connection between said first retaining cord and said second flexible elongated member is slidable relative to one another at least at all of the connecting points minus one connecting point, said first retaining cord including means for removably connecting said two extremities of said first retaining cord to one another;
   (c) a second retaining cord disposed substantially parallel to said two rows of diamond-shaped openings included in said network of flexible elongated members along the other boundary of said network of flexible elongated members and connected to said third flexible elongated member at each of zig-zag points and said one extremity of said third flexible elongated member constituting said the other boundary of said network of flexible elongated members wherein the connection between said second retaining cord and said third flexible elongated member is slidable relative to one another at least at all of the connecting points minus one connecting point, said second retaining cord including means for removably connecting two extremities of said second retaining cord to one another; and
   (d) a linking flexible elongated member with one extremity connected to one of said two extremities of said second retaining cord and including a means disposed at the other free extremity of said linking flexible elongated member for removably connecting said other free extremity to the junction connecting said the other extremities of said second flexible elongated member and said first retaining cord to one another;
   whereby, said linking flexible elongated member disposed in a zig-zag pattern across said network of flexible elongated members and removably linked to the connection between said the other extremities of said first and said third flexible elongated members and to the connection between said one extremities of said first and said second flexible elongated members provides a closed loop of said network of flexible elongated members when said free extremity of said linking flexible elongated member is connected to said junction of said the other extremities of said first retaining cord and said second flexible elongated member, wherein the closed loops of said first and second retaining cords under tension secure said continuous snow chain to a tire.

2. The combination as set forth in claim 1 wherein said connection between said one extremities of said first and said second flexible elongated members includes a linking element for linking with said linking flexible elongated member and said connection between said the other extremities of said first and said third flexible elongated members includes a linking element for linking with said linking flexible elongated member.

3. The combination as set forth in claim 2 wherein said linking flexible elongated member includes a pair of linking elements for linking said linking flexible elongated member with said linking element included in said connection between said one extremities of said first and second flexible elongated members and with said linking element included in said connection between said the other extremities of said first and said third flexible elongated members.

4. A continuous snow chain comprising in combination :
   (a) a first flexible elongated member disposed in zigzag patter intermediate a second flexible elongated member and a third flexible elongated member respectively disposed in zig-zag pattern, said first, second and third flexible elongated members connected to each other and assembled in a network of flexible elongated members of a finite length including two parallel rows of substantially diamond-shaped openings wherein one extremity of said first flexible elongated member and one extremity of said second flexible elongated member are connected to one another and one extremity of said third flexible elongated member is disposed by itself at one extremity of said network of flexible elongated members, and the other extremity of said first flexible elongated member and the other extremity of said third flexible elongated member are connected to one another and the other extremity of said second flexible elongated member is disposed by itself at the other extremity of said network of flexible elongated members;
   (b) a first retaining cord disposed substantially parallel to said two rows of diamond-shaped openings included in said network of flexible elongated members along one boundary of said network of flexible elongated members and connected to said second flexible elongated member at each of zig-zag points and said the other extremity of said second flexible elongated member constituting said one boundary of said network of flexible elongated members wherein the connection between said first retaining cord and said second flexible elongated member is slidable relative to one another at least at all of the connecting points minus one connecting point, said first retaining cord including means for removably connecting said two extremities of said first retaining cord to one another;

(c) a second retaining cord disposed substantially parallel to said two rows of diamond-shaped openings included in said network of flexible elongated members along the other boundary of said network of flexible elongated members and connected to said third flexible elongated member at each of zig-zag points and said one extremity of said third flexible elongated member constituting said the other boundary of said network of flexible elongated members wherein the connection between said second retaining cord and said third flexible elongated member is slidable relative to one another at least at all of the connecting points minus one connecting point, said second retaining cord including means for removably connecting two extremities of said second retaining cord to one another; and (d) a linking flexible elongated member with one extremity connected to said one extremity of said third flexible elongated member and including a means disposed at the other free extremity of said linking flexible elongated member for removably connecting said other free extremity to the junction connecting said the other extremities of said second flexible elongated member and said first retaining cord to one another;

whereby, said linking flexible elongated member disposed in a zig-zag pattern across said network of flexible elongated members and removably linked to the connection between said the other extremities of said first and said third flexible elongated members and to the connection between said one extremities of said first and said second flexible elongated members provides a closed loop of said network of flexible elongated members when said free extremity of said linking flexible elongated member is connected to said junction of said the other extremities of said first retaining cord and said second flexible elongated member, wherein the closed loops of said first and second retaining cords under tension secure said continuous snow chain to a tire.

5. The combination as set forth in claim 4 wherein said connection between said one extremities of said first and said second flexible elongated members includes a linking element for linking with said linking flexible elongated member and said connection between said the other extremities of said first and said third flexible elongated members includes a linking element for linking with said linking flexible elongated member.

6. The combination as set forth in claim 5 wherein said linking flexible elongated member includes a pair of linking elements for linking said linking flexible elongated member with said linking element included in said connection between said one extremities of said first and second flexible elongated members and with said linking element included in said connection between said the other extremities of said first and said third flexible elongated members.

* * * * *